United States Patent
Chen et al.

(10) Patent No.: US 7,221,315 B1
(45) Date of Patent: May 22, 2007

(54) GPS SYSTEM FOR RECEIVING AND PROCESSING GPS SIGNAL AND TRAFFIC INFORMATION SIGNAL

(75) Inventors: Wei-Liang Chen, Chung Ho (TW); Shih-Chieh Ting, Chung Ho (TW)

(73) Assignee: Globalsat Technology Corporation, Taipei Hsien (TW)

( * ) Notice: Subject to any disclaimer, the term of this patent is extended or adjusted under 35 U.S.C. 154(b) by 0 days.

(21) Appl. No.: 11/425,131

(22) Filed: Jun. 19, 2006

(51) Int. Cl.
*G01S 5/14* (2006.01)
*G08G 1/123* (2006.01)

(52) U.S. Cl. .......................... 342/357.13; 340/995.13; 701/213

(58) Field of Classification Search ............ 342/357.13, 342/357.06; 340/995.13; 701/213
See application file for complete search history.

(56) References Cited
U.S. PATENT DOCUMENTS 6,473,688 B2 * 10/2002 Kohno et al. .............. 701/213

FOREIGN PATENT DOCUMENTS

JP 2005192166 A * 7/2005

OTHER PUBLICATIONS

English Translation of JP 2005192166 A.*

\* cited by examiner

*Primary Examiner*—Thomas H. Tarcza
*Assistant Examiner*—Fred H. Mull

(57) ABSTRACT

A GPS system comprising a GPS receiver for receiving and processing a GPS signal is provided. The traffic information receiver is adapted for receiving traffic information signal and a storage device for storing the GPS signal and the traffic information signal. The GPS receiver comprises a wireless receiver and a processor. The wireless receiver is adapted for receiving the GPS signal. The processor is adapted for controlling the wireless receiver and rotationally storing the GPS signal and the traffic information signal at a predetermined time period, and then transmitting the stored GPS signal and traffic information signal, in order, to the storage device, wherein the information corresponding to the GPS signal and the traffic information signal are transmitted according to a specific time or frequency setup by the processor.

10 Claims, 4 Drawing Sheets

GPS SYSTEM FOR RECEIVING AND PROCESSING GPS SIGNAL AND TRAFFIC INFORMATION SIGNAL

BACKGROUND OF THE INVENTION

1. Field of the Invention

The present invention generally relates to a system for receiving and processing a GPS signal and a traffic information signal, and more particularly to a GPS system for receiving and processing a GPS signal and a traffic information signal, wherein a processor of a GPS receiver rotationally stores the GPS signal and the traffic information signal into a buffer and then transmits the stored signals to a storage device, in order, for displaying the information.

2. Description of the Related Art

Presently, a traffic condition has improved significantly to provide more convenience and quality to our every day activities. Accordingly, a concept of global village is created. For saving energy, precious time and increasing efficiency, a system to accurately locate a person or object in a large range and to communicate thereto without any limit of time and location is very essential. Accordingly, a global positioning system (GPS) has been developed to accurately provide the information of the latitude and the longitude to enable the users all around the world know their exact location.

Furthermore, there are two major purposes of the GPS system. The first purpose is to locate, retrieve exact location information by referring to the location information transmitted by the satellite, and the second purpose is to synchronize signal in the internet. Because the satellite provides a time signal, and if the world wide internet system can receive this time signal, the internet system will have a stable resource for the synchronized signal, and most of the devices may be gradually designed to rely on this simple and stable method for receiving the synchronized signal.

Generally, a GPS receiver receives signals from a plurality of satellites corresponding to the positions of objects or persons, and the time signal can be chosen from a signal with the best quality. The GPS system is mostely used in the transportation industry. GPS receiver is installed in a car, airplane or a ship to receive the satellite signal to enable the user to learn the exact location for various services, for example, navigation, SOS, road rescue, security and so on.

As the semiconductor technology is well developed, the overall cost may be reduced. Thus, the car GPS is widely used, and the use of GPS system in the car has become the major purpose of the GPS system. Commonly, the user uses the GPS system with the car LCD display or the PDA for retrieving map signal and navigation status information.

Furthermore, the FM radio message system is another appliance of the traffic message channel (TMC), which broadcast the traffic and weather information to guide the user to take a proper route to arrive at the destination. The traffic information is being updated on real time basis, for example accident, traffic and other information, so that the user may choose the best route to arrive at the destination. Therefore, the TMC provides the traffic information on real time basis to the users on the road and the TMC is different from the roadside traffic news bulletin board.

When using the TMC and the GPS receiver in the car navigation, the TMC receives the real time traffic information and transmits the GPS signal and traffic signals to LCD display, PDA or car navigator where it is displayed. Referring to FIG. 4, the conventional terminal device A comprises a receiving interface A1 to receive signals from a GPS receiver C1 and a traffic information receiver C2. When the receiving interface A1 simultaneously receives GPS and traffic signals, a processor A2 in the terminal device A encodes the GPS and traffic signals and then wraps it into a packet as a signal set which is then transmitted to a receiving interface B1 of a portable host B through a transmission interface A3 of the terminal device A. Next, a memory program B2 in the portable host B decodes and restores the signal set into the GPS signal and traffic information so that the portable host B displays the map represented by the GPS signal and traffic information. Even though the conventional art provides the GPS signal and the traffic information signal to the portable host B, but there are still more defects, which are described as follows.

1. The conventional terminal device A simultaneously receives the signals transmitted by the GPS receiver C1 and the traffic information receiver C2, which is then encoded into a packet for converting signals into a signal set and then transmitted to the portable host B where it is decoded. Because, the GPS signal and traffic information signal are both continuously simultaneously transmitted, thus often packaging and decoding processes occupies the memory capacity and the system resource of the terminal device A and the portable device B, and therefore the overall transmission quality is adversely affected.
2. When the terminal device A simultaneously receives the GPS signal and traffic information signal, interference between the GPS signal and the traffic signal may easily occur and cause instability in signal transmission, or the information may be overwritten and become invalid.

Therefore, how to overcome the above defects is an important issue for the manufacturers in the field.

SUMMARY OF THE INVENTION

According to the aspect of the present invention, the GPS system comprises a GPS receiver having a processor for rotationally storing a GPS signal and a traffic information signal into a buffer and then transmitting, in order, to a storage device. The GPS signal and the traffic information signal are stored in a buffer of the processor, and no extra controlling and calculating elements by encoding and decoding process is required. The information corresponding to the GPS signal and the traffic information signal may be displayed by the storage device. Because the GPS signal and the traffic information signal are transmitted, in order, the interference between the GPS signal and the traffic information signal may be avoided. The GPS signal and the traffic information signal are stored in the buffer of the processor of the GPS receiver and therefore no memory capacity in the GPS receiver or the storage device is occupied. Thus, the overall transmission quality may be effectively promoted.

According to another aspect of the present invention, the processor of the GPS receiver rotationally processes the GPS signal and the traffic information signal and then temporally stores them in the buffer. Thus, the GPS signal and the traffic information signal may not interfere with each other rendering the signal transmission more stable. Furthermore, the possibility of the information being overwritten and being invalid may also be reduced.

According to another aspect of the present invention, the processor of the GPS receiver alternately stores the GPS signal and the traffic information signal into the buffer, and the whole signal may be transmitted, in order, to the storage device for displaying. The traffic information receiver can be an external device or a built-in device in the GPS receiver. Thus, the application of the GPS system of the present invention can be wider.

DETAIL DESCRIPTION OF THE INVENTION

Figure 1:
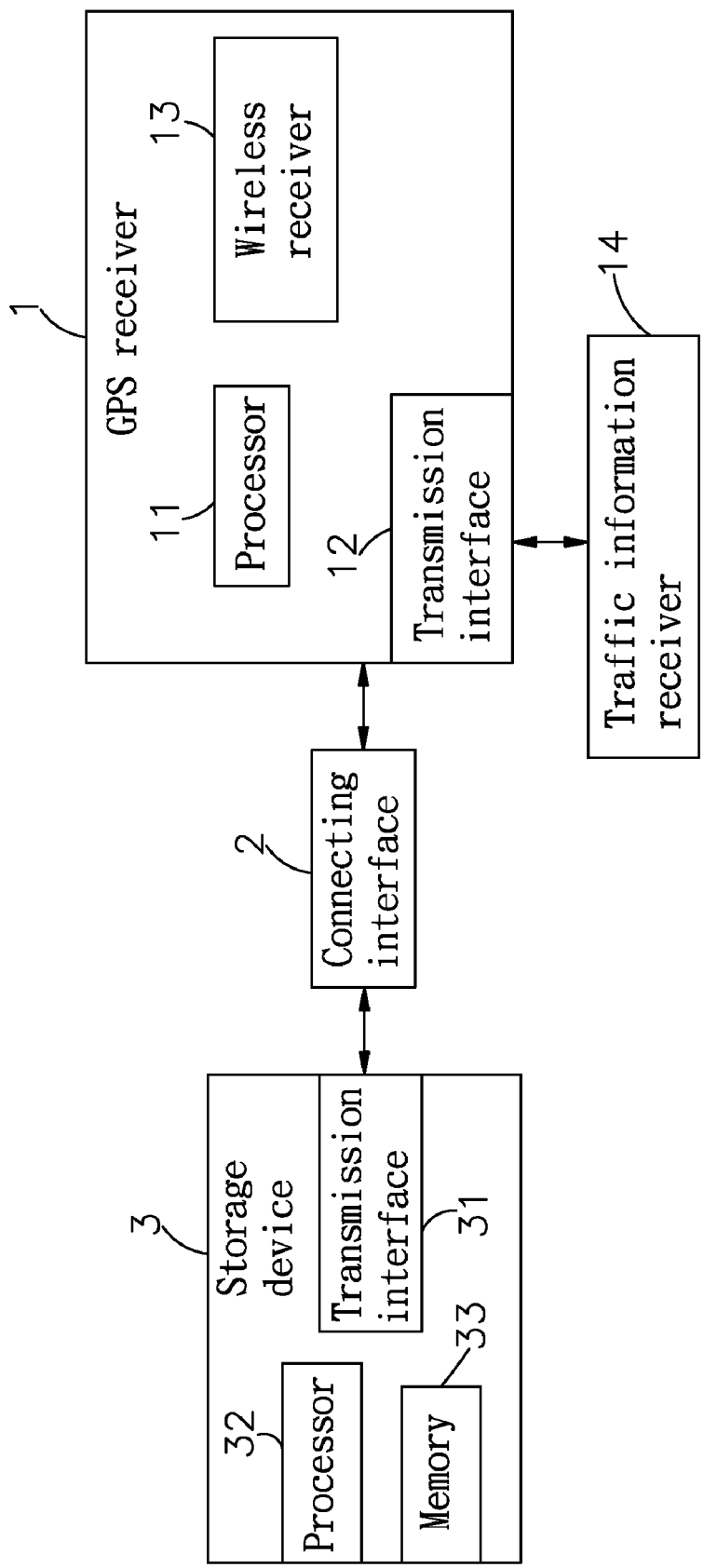
FIG. 1 is a block diagram of a GPS system according to an embodiment of the present invention.

Referring to FIG. 1, a GPS system of the present invention comprises a GPS receiver 1, a connecting interface 2 and a storage device 3. The GPS receiver 1 is connected to the storage device 3 via the connecting interface 2. The GPS receiver 1 comprises a processor 11, a transmission interface 12 and a wireless receiver 13. The processor 11 is electrically connected to the transmission interface 12 so that the processor 11 can receive traffic information signal transmitted from a traffic information receiver 14 via the transmission interface 12. The traffic information receiver 14 may be a digital audio broadcasting (DAB), a general packet radio service (GPRS) or any other receiver having the equivalent function. The GPS receiver 1 is electrically connected to a transmission interface 31 of the storage device 3 through the connection interface 2. The connection interface 2 may be an IEEE1394, a USB, a SATA, an IDE, a RS232, a SCSI, a serial port, a parallel port or any other wired transmission interface or an antenna, a radio, an infrared ray, a Bluetooth or any other wireless transmission interface capable of connecting the GPS receiver 1 with the storage device 3 for facilitating signal transmission. The storage device 3 further comprises a processor 32 and a memory 33, and may be capable of processing the signal for displaying the GPS navigation information.

Figure 2:
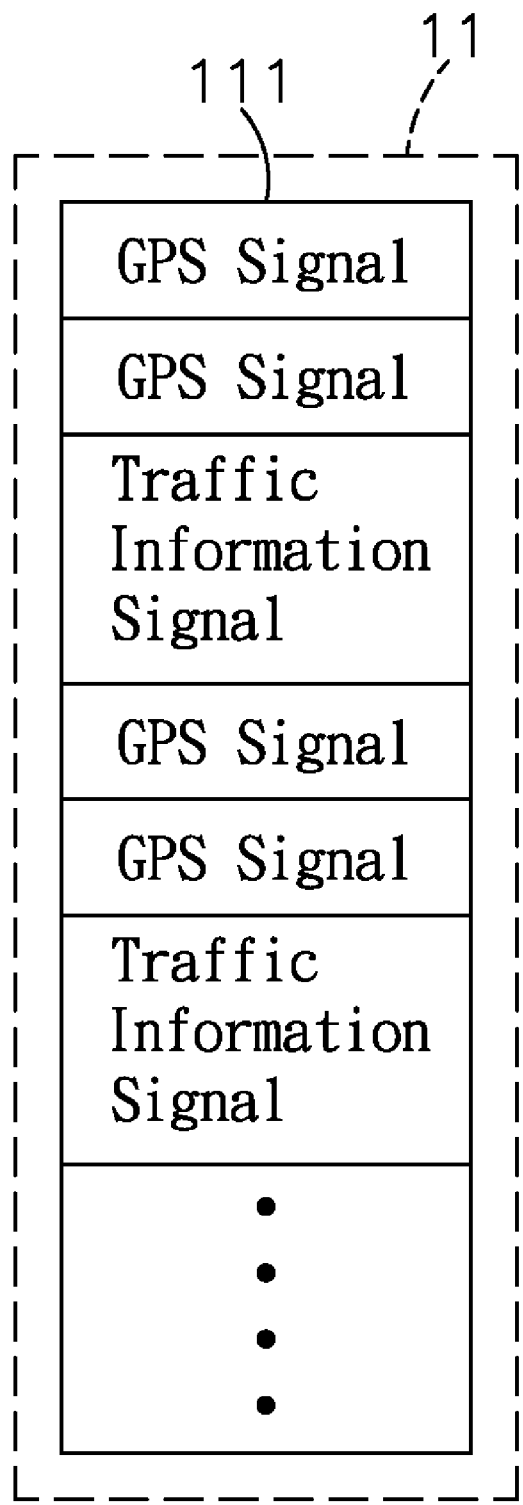
FIG. 2 is a diagram illustrating a process of receiving the GPS signal and the traffic information signal according to an embodiment of the present invention.

Referring to FIGS. 1 and 2, the processor 11 of the GPS receiver 1 alternately processes GPS signals and traffic information signals. The processor 11 temporarily stores the GPS signal into a buffer 111, a firmware program in the processor 11 is set within a best time, and the processor 11 temporarily stores the traffic information signal into the buffer 111. Thus, after the storage of the traffic information signal, the processor 11 continues to store the GPS signal. By using the setup of the firmware program in the processor 11, the GPS signal and the traffic information signal can be alternately transmitted to the GPS receiver 1.

Therefore, the GPS signals and the traffic information signals stored in the buffer 111 may be further transmitted, in order, to the storage device 3 for displaying according to a specific time or frequency setup by the processor 11. Thus, the processor 11 of the GPS receiver 1 alternately controls the GPS signals and the traffic information signals stored in the buffer 111, which is then transmitted to the storage device 3, wherein an application software in the storage device 3 directly identifies file headers of the GPS signals and the traffic information signals and uses for displaying the GPS navigation information and playing audio traffic information.

Furthermore, according to an embodiment of the present invention, the traffic information signal is a data stream and the size of each data packet is fixed, and therefore the processor 11 can identify the file header of the data packet to complete the receipt of the data.

Figure 3:
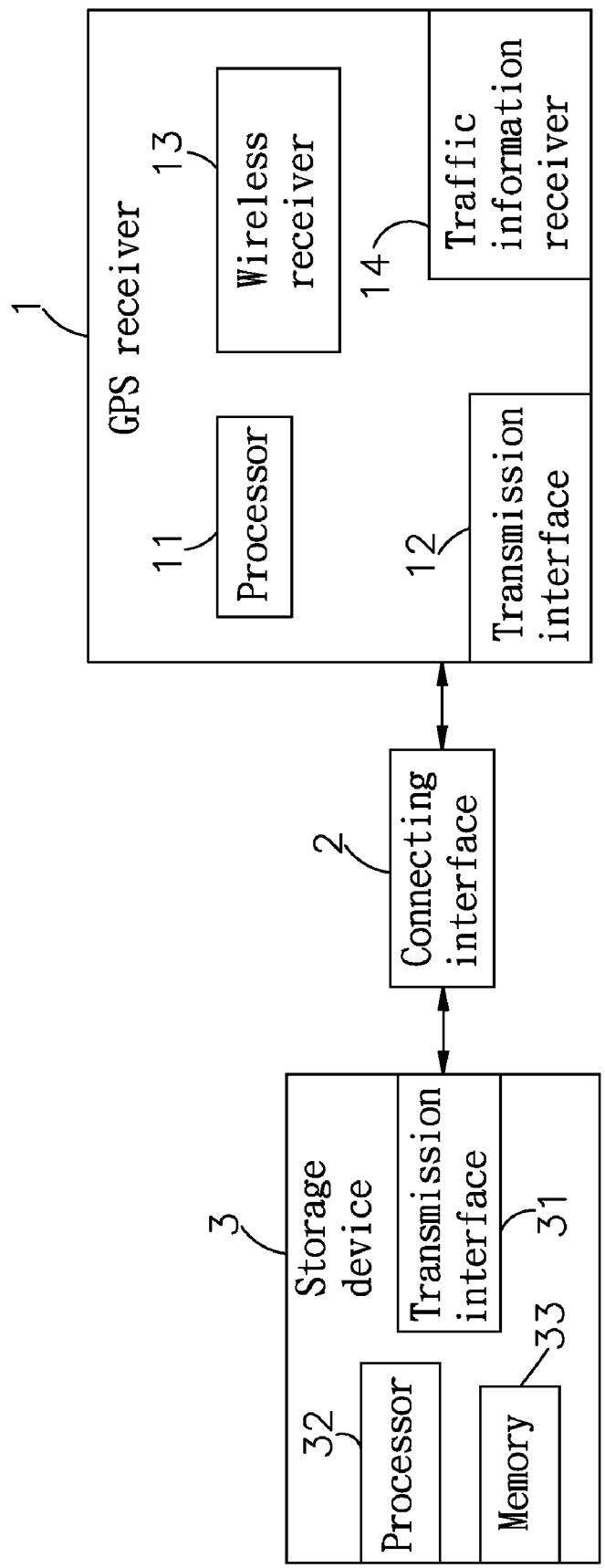
FIG. 3 is a block diagram of a GPS system according to another embodiment of the present invention.
Figure 4:
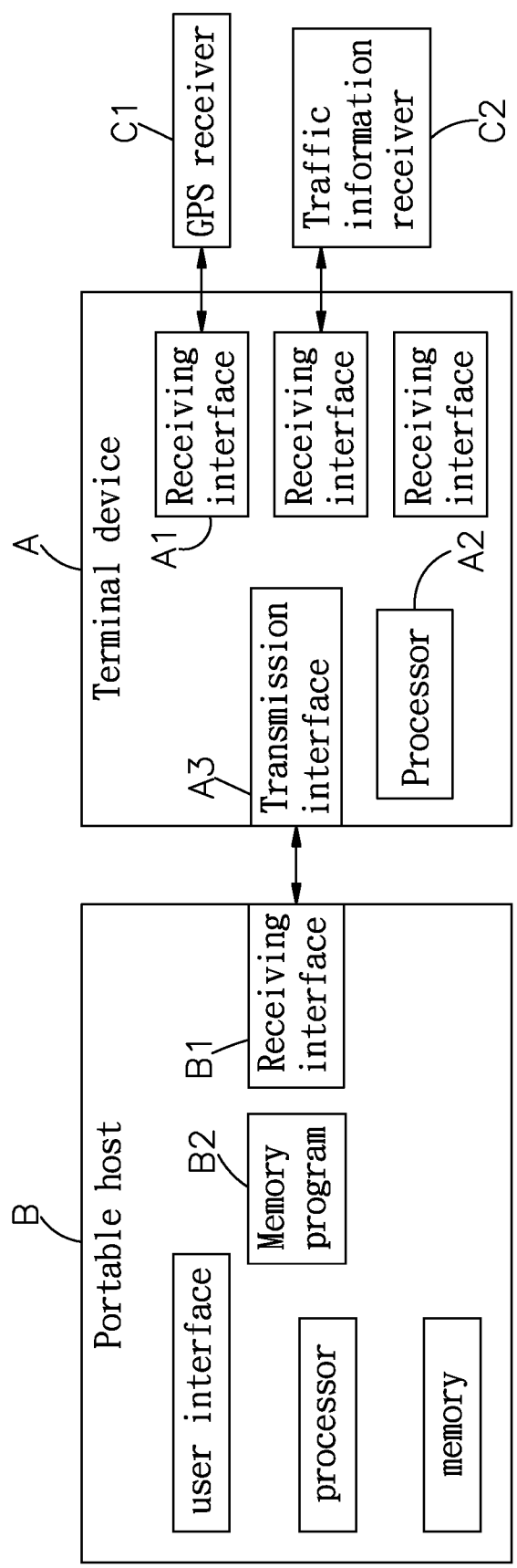
FIG. 4 is a block diagram of a conventional GPS system.

FIG. 3 shows an alternate form of the GPS receiver 1. This alternate form is substantially similar to the GPS receiver 1 shown in FIG. 1 with the exception of the traffic information receiver 14. The traffic information receiver 14 can be a built-in device in the GPS receiver 1. The storage device 3 may be a PDA, a portable telephone, a portable computer or a host equipped with a monitor and a speaker. The storage device 3 can notify a user about the traffic status and the immediate traffic information. It should be noted that any modification of the above concept of the present invention should be construed within the scope of the present invention.

Accordingly, the GPS receiver 1 of the present invention has at least the following advantages.

1. The processor 11 of the GPS receiver 1 is adapted for alternately controlling and storing the GPS signals and the traffic information signals in the buffer 111 and does not require any extra controlling or calculating elements. Furthermore, unlike the conventional art, it is not necessary to encode and package the GPS signals and the traffic information signals into a signal set by the processor 11, and then transmitted to the storage device 3 for decoding. Thus, the encoding and decoding procedures of the conventional art may be effectively avoided. Thus, the memory capacity of the GPS receiver 1 and the storage device 3 may not be occupied, and the overall transmission quality may be effectively promoted.

2. Because the processor 11 of the GPS receiver 1 is adapted for alternately controlling and storing the GPS signals and the traffic information signals in the buffer 111, and therefore, the possibility of interference between the GPS signals and the traffic information signals may be effectively avoided and thereby promote the stability of signal transmission, or the possibility of the information being overwritten and being invalid may also be reduced.

3. The most important feature of the present invention is that the GPS receiver 1 alternately processes the GPS signals and the traffic information signals and completely transmits the signals, in order, to the storage device 3. The traffic information receiver 14 may be an external device or a built-in device in the GPS receiver 1.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed is:

1. A GPS system, for receiving a GPS signal and a traffic information signal, comprising:
   a storage device; and
   a traffic information receiver for receiving traffic information signal
   a GPS receiver, comprising:
      a wireless receiver, for receiving said GPS signal; and
      a processor, for rotationally storing said GPS signal and said traffic information signal each at a respective predetermined time period, into a buffer, and for transmitting said stored GPS signal and said stored traffic information signal, in order, to said storage device for displaying according to a specific time or frequency setup by said processor, wherein said GPS signal and said traffic information signal are stored in a buffer and then transmitted, in order, to said storage device.

2. The GPS system according to claim 1, wherein said GPS receiver further comprises a transmission interface connected to said processor for receiving signals from a traffic information receiver.

3. The GPS system according to claim 1, wherein said traffic information receiver can be a built-in device in said GPS receiver.

4. The GPS system according to claim 1, wherein said traffic information receiver can be a digital audio broadcasting (DAB) or, a general packet radio service (GPRS).

5. The GPS system according to claim 1, wherein said GPS receiver is connected to a transmission interface of said storage device through a connecting interface for transmitting said GPS signal or said traffic information signal received by said GPS receiver to said storage device.

6. The GPS system according to claim 5, wherein said connecting interface can be an IEEE1394, a USB, a SATA, an IDE, a RS232, a SCSI, a serial port, or a parallel port.

7. The GPS system according to claim 5, wherein said connecting interface can be an antenna, a radio, an infrared ray, a Bluetooth or any other wireless transmission interface.

8. The GPS system according to claim 1, wherein said storage device comprises a processor, a memory and an application software, wherein said application software is adapted for identifying a file header of said GPS signal or said traffic information signal for displaying corresponding information.

9. The GPS system according to claim 1, wherein said processor of said GPS receiver rotationally stores said GPS signal and said traffic information signal into said buffer, and wherein said processor transmits said GPS signal and said traffic information signal in order according to a specific time or frequency setup by said processor to store in said storage device.

10. The GPS system according to claim 1, wherein said storage device can be a PDA, a portable telephone, a portable computer or a device equipped with a monitor and a speaker.

* * * * *